2 Sheets--Sheet 1.
G. W. ELLIS & C. W. GLIDDEN.
Machinery for Attaching Heels to Boots and Shoes and Polishing the Same.
No. 5,413. Reissued May 20, 1873.
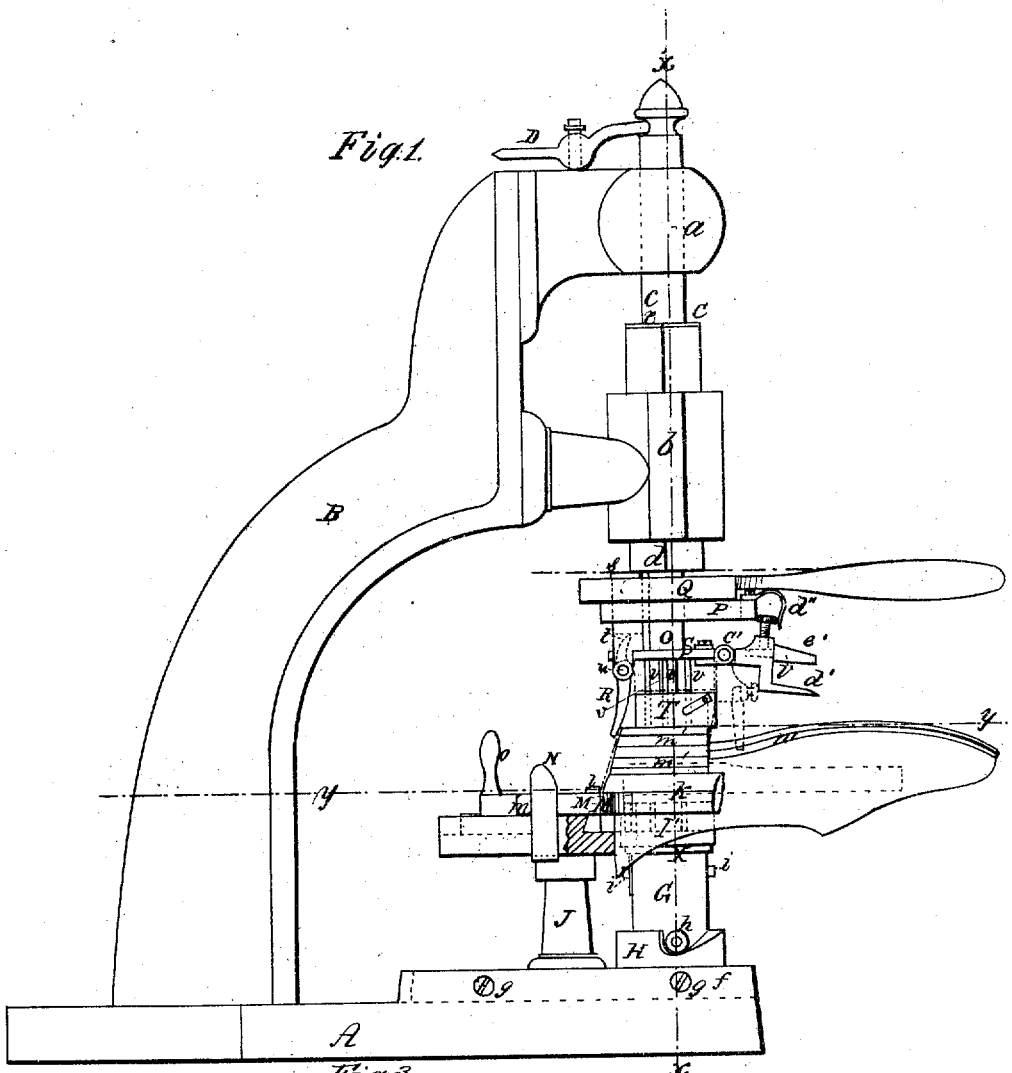
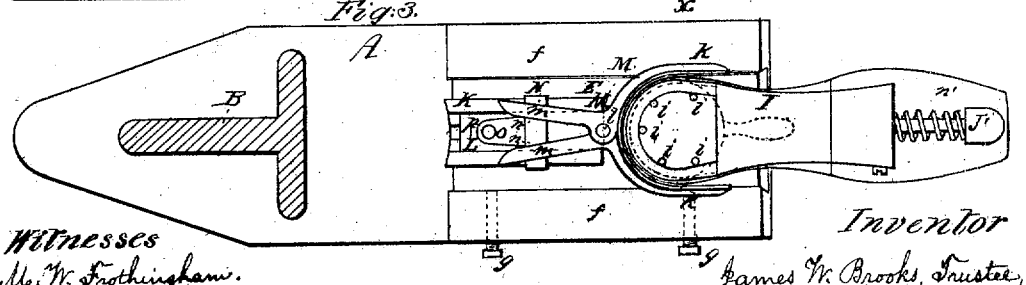
Witnesses
M. W. Frothingham.
S. B. Kidder.
Inventor
James M. Brooks, Trustee,
By his Attys.
Crosby & Gould.

2 Sheets--Sheet 2.
G. W. ELLIS & C. W. GLIDDEN.
Machinery for Attaching Heels to Boots and Shoes and Polishing the Same.
No. 5,413. Reissued May 20, 1873.
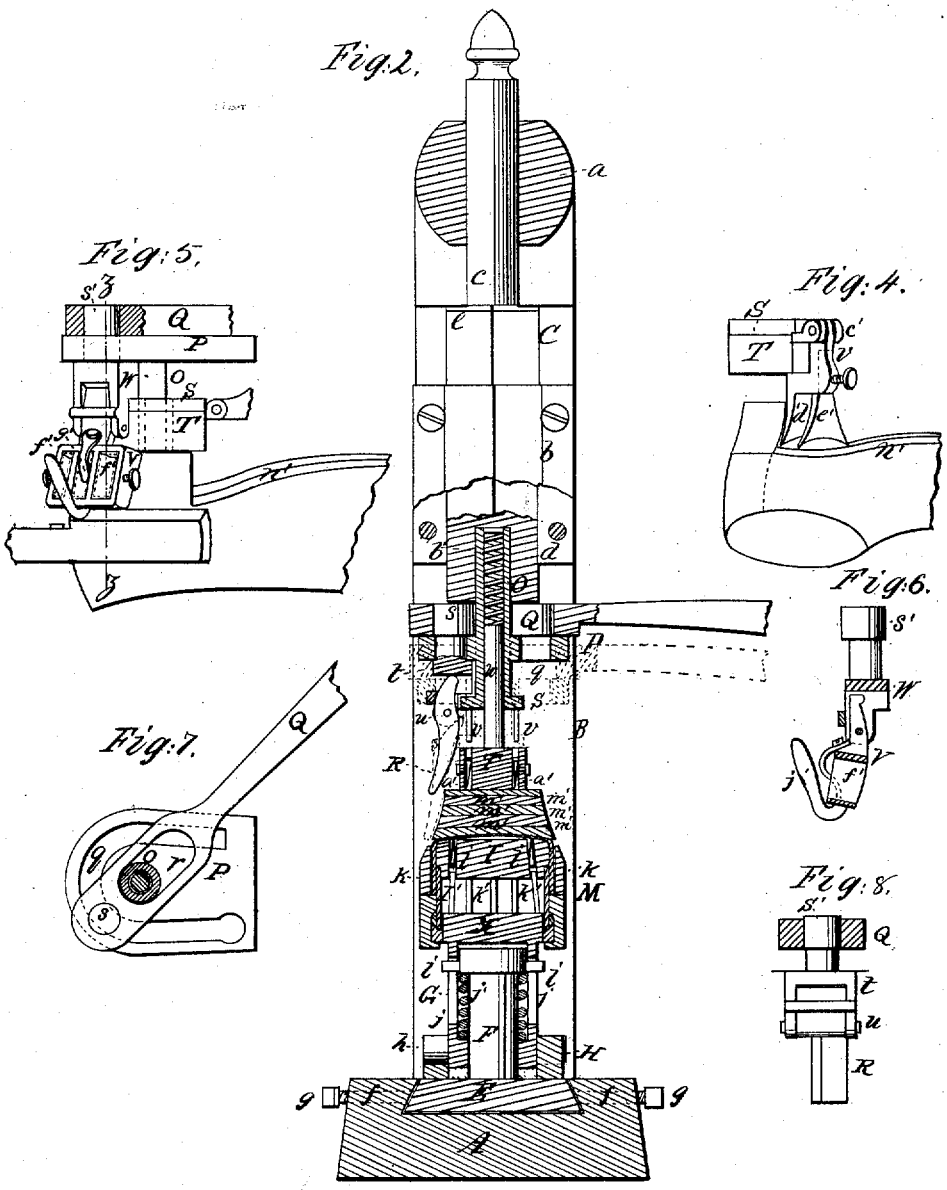
Witnesses
M. W. Nothingham.
S. B. Kidder.
Inventor
James W. Brooks, Trustee.
By his Attys.
Crosby & Gould

UNITED STATES PATENT OFFICE.

GEORGE W. ELLIS AND CHARLES W. GLIDDEN, OF STONEHAM, MASSACHUSETTS, ASSIGNORS, BY MESNE ASSIGNMENTS, TO JAMES W. BROOKS, TRUSTEE.

IMPROVEMENT IN MACHINERY FOR ATTACHING HEELS TO BOOTS AND SHOES, AND POLISHING THE SAME.

Specification forming part of Letters Patent No. 36,607, dated October 7, 1862; reissue No. 5,413, dated May 20, 1873; application filed April 25, 1873.

*To all whom it may concern:*

Be it known that GEORGE W. ELLIS and CHARLES W. GLIDDEN, both of Stoneham, in the county of Middlesex and State of Massachusetts, invented an Improved Machine for Attaching Heels to Boots and Shoes, and Polishing the Same, of which the following is a specification:

The invention relates to the organization of mechanism for attaching heels to boots and shoes, and compressing such heels, and for trimming and burnishing such attached heels; and the invention consists in details of construction and arrangement of the nailing mechanism, the trimming mechanism, and the burnishing mechanism.

Figure 1 is a side elevation of the machine. Fig. 2 is a vertical section taken on the line *x x*. Fig. 3 is a horizontal section taken on the line *y y*. Figs. 4 and 5 are views of details. Fig. 6 is a vertical section on the line *z z*. Fig. 7 is a plan of a portion of the mechanism. Fig. 8 is a detached side view of a portion of the mechanism.

A represents a bed-plate, to which a curved support, B, is attached, said support having at its upper part two guides *a b*, in which a vertical shaft, C, is fitted, and allowed to slide freely up and down. The part *c* of the shaft C is connected to the lower part *d* by a swivel joint at *e*, and the upper part *c* has a lever, D, attached to it for the purpose of elevating and depressing the shaft, as will be fully understood by referring to Fig. 1. On the base or bed-plate A there are placed two guides *f f*, between which a slide, E, is fitted, said slide being secured at any desired point by set-screws *g*. On the slide E there is fixed a vertical post, F, and on the post F there is placed a tube, G, which is allowed to slide freely up and down, and has friction-rollers *h h* at its lower part at two opposite points, said rollers resting on an annular double cam, H, which is allowed to turn freely around the tube G. The tube G is prevented from turning with the cam H by means of pins *i i*, which project from the post F through slots *j j* in the tube G, as shown in Figs. 1 and 2. A spiral spring, *j'*, is placed around the post F, beneath the pins *i i*. To the upper part of the post F there is attached a bed, I, which corresponds in form to the back part of a last, as shown in Fig. 3. To the slide E, just behind the post F, there is attached an upright, J, which supports a horizontal bed, K, in which a slide, L, is fitted and allowed to work freely. To the upper surface of this slide L there is attached a clamp, M, which is formed of two jaws, *k k*, connected by a fulcrum-pin, *l*, as shown plainly in Fig. 3. The jaws *k k* are provided with tangs *m m*, and the tangs are embraced by a plate, N, which has two oblique openings, *n n*, in it, through which the tangs *m m* pass. The plate N is provided with a handle, *o*, and a projection on the under side of the plate N, fits in a slot, *p*, in the the slide L. (See Fig. 3.) In the lower end of the shaft C there is fitted a tube, O. This tube O has secured to it a horizontal plate, P, which has a curved slot, *q*, made in it, said slot corresponding in form to the desired form of the heel which is to be attached to the sole of the boot or shoe. (See Fig. 7. On the tube O, and directly above the plate P, there is placed a lever, Q. This lever has an oblong slot, *r*, made in it through which the tube O passes. In the slot *q* of plate P, there is fitted a rod, *s*, which has a yoke, *t*, at its lower end; said yoke containing a knife, R, which is hinged within the yoke or secured therein by a joint, *u*. To the lower end of the tube O there is attached a plate, S, which is of a form corresponding to the desired form of the heel, but somewhat shorter. This plate S, has a series of rods, *v*, attached to it all around it, near its periphery. Within the tube O there is placed an arbor, *w*, to the lower end of which there is secured a plate, T, having a series of holes, *a'*, made in it to receive the rods *v*, when the latter are pressed or forced down. Within the tube O, and above the arbor *w*, there is placed a spiral spring, *b'*, which has a tendency to keep the plate T pressed downward. (See Fig. 2.)

To the front edge of the plate S there is attached, by a joint or hinge, $c'$, an arm, U, which is of bent or right-angular form, as shown clearly in Figs. 1 and 4, and has a cutter, $d'$, attached. To the arm U, at its angle, there is attached a stop or gage, $e'$, which is parallel with the cutter $d'$ and about of equal length with it, as shown in Fig. 4. The arm U, when the cutter $d'$ is not in use, is held up by a spring-catch, $d''$. V, Figs. 5 and 6, represents a small frame in which is secured a burnisher. The frame V may be hinged to a yoke, W, in precisely the same way that the knife R is connected to its yoke $t$. The frame V may have a small handle, $f'$, attached to it, and said frame is attached to a rod, $s'$. The upper end of the tube G has a horizontal bed, X, attached to it, and this bed forms a support for rods $k'$, which are placed in holes $l'$ in the back part of the last or bed I, said holes $l'$ being formed in a curve corresponding to the shape of the heel, as shown in Fig. 3.

The operation is as follows: The boot or shoe Y is placed on the last or bed I and the heel Z, which is made in the usual way, to wit, of a series of strips or layers, $m'$, is placed in a proper position on the sole $n'$ of the shoe. Previous, however, to the placing of the shoe on the last or bed I, the holes $l'$ have nails placed in them, with their heads downward, the heads of the nails resting on the tops of the rods $k'$, (see Fig. 2,) in which the nails are shown in blue. The holes $a'$ in the plate T are also filled with nails, with their points downward, one nail being in each hole. After the shoe is adjusted on the last or bed I the shaft C is forced down by actuating the lever D and the rods $v$ of plate S, will drive the nails in plate T into the heel Z, and the several strips or layers $m'$ comprising the same, will be connected together. The shaft C is still kept depressed, the plate T bearing on the heel Z, and the cam H is turned and the tube G forced up. As the tube G rises, the rods $k'$ force the nails in the holes $l'$ up through the sole $n'$ and out into the heel Z, thereby securing the heel to the sole. After this operation, the clamp M is moved forward and the jaws $k$ $k$ grasp the upper of the shoe at the junction of the heel and sole, the lever Q is then turned, and the knife R cuts or trims the outer surface of the heel in proper form. The slot $q$ in the plate P serves as a guide to the knife R, while the clamp M protects the upper, preventing the end penetrating it. The clamp also serves to keep the shoe in position on the last or bed I. The clamp M is self-acting—that is to say, as the clamp is shoved forward the plate N actuates the jaws $k$ $k$. After the knife R has performed its work, it is removed from the lever Q, and the frame V adjusted to the lever. The operator then works the burnisher around the heel by actuating the lever Q, and the heel is burnished. The bent arm U is then released from its catch $d''$, the cutter $d'$ and gage $e'$ allowed to descend to a vertical position, and the shaft C is then forced down the cutter $d'$, cutting the inner edge of the heel, and the gage $e'$ preventing the cutter from penetrating the sole $n'$ of the shoe. To the back part of the last I there is attached a metallic strap I'. (See Fig. 1.) This strap is essential, as it covers or incloses the rods $k'$, and prevents the upper of the shoe from interfering or coming in contact therewith. This will be fully understood by referring to Fig. 2, in which the upper is shown in blue, extending down over the strap I'. In order to render the last I adaptable to boots and shoes of different lengths, an adjustable or yielding toe-piece, J', is added to it, as shown in Fig. 1.

By this invention, the part of boot and shoe making pertaining to the heel is greatly expedited, and the work performed in a better manner than by the ordinary manual process.

*Claims.*

1. The perforated plate T having a shank or neck, $w$, fitted to work up and down in the tube O, which terminates at its lower end in a plate, S, provided with rods $v$, the perforated plate being forced downward to hold the heel of the shoe or boot firmly upon its last by a helical spring within the tube, in combination with the last or bed I, sliding tube G, rods $k'$, and cam H, when arranged for joint operation in the manner and for the purpose described.

2. The slotted lever Q fitted upon the tube O, and having a hinged knife, R, attached to its outer end by a shank or neck, $s$, fitted to work in a curved slot, $q$, in the plate P, when the whole is combined and arranged to operate in the manner described.

3. In combination with a mechanism for holding a boot or shoe, a burnisher arranged to move around and be held against the curved surface of the heel edge by means substantially as described.

4. The strap or guard I' attached to the last I at its back part when used in combination with the rods $k'$, for the purpose specified.

5. The clamp M attached to the slide L in connection with the plate N or its equivalent, when arranged to operate in connection with the knife R, substantially as and for the purpose specified.

6. The cutter $d'$ provided with a gage, $e'$, attached to the adjustable arm U, which is connected to the plate S, as and for the purpose herein set forth.

JAMES W. BROOKS, *Trustee.*

Witnesses:
FRANCIS GOULD,
M. W. FROTHINGHAM.